US012629580B2

(12) United States Patent
Chock

(10) Patent No.: US 12,629,580 B2
(45) Date of Patent: May 19, 2026

(54) PLAYER PROFILE DATA MANAGEMENT SYSTEM

(71) Applicant: Baseball App LLC, Beaverton, OR (US)

(72) Inventor: Travis Chock, Portland, OR (US)

(73) Assignee: BASEBALL APP LLC, Beaverton, OR (US)

( * ) Notice: Subject to any disclaimer, the term of this patent is extended or adjusted under 35 U.S.C. 154(b) by 306 days.

(21) Appl. No.: 18/312,974

(22) Filed: May 5, 2023

(65) Prior Publication Data

US 2023/0356057 A1 Nov. 9, 2023

Related U.S. Application Data

(60) Provisional application No. 63/364,317, filed on May 6, 2022.

(51) Int. Cl.
*G06F 16/78* (2019.01)
*A63B 71/06* (2006.01)
*G06F 16/23* (2019.01)

(52) U.S. Cl.
CPC ...... *A63B 71/0616* (2013.01); *G06F 16/2379* (2019.01)

(58) Field of Classification Search
None
See application file for complete search history.

(56) References Cited

U.S. PATENT DOCUMENTS

| | | | | |
|---|---|---|---|---|
| 11,120,079 B2 * | 9/2021 | White | ................ | G06Q 30/0631 |
| 2005/0183114 A1 * | 8/2005 | Lupoi | ................ | G09B 7/02 |
| | | | | 725/35 |
| 2016/0191434 A1 * | 6/2016 | Rice | ................ | H04L 51/10 |
| | | | | 709/204 |
| 2020/0073630 A1 * | 3/2020 | Sayre | ................ | G06F 7/00 |

\* cited by examiner

*Primary Examiner* — Sunit Pandya
(74) *Attorney, Agent, or Firm* — McCoy Russell LLP

(57) ABSTRACT

A method for managing sports data is provided. In one example, the method includes, responsive to receiving, at a display of a computing device, a request for initiating a sub-event of a sporting event, accumulating data at a computing device during a sub-event of a sporting event. Transmission of the data to a central database may be delayed based on a pre-set delay interval. Upon receiving confirmation of completion of the pre-set delay interval, the data may be transmitted to the central database and correlated with hierarchically-arranged data profiles stored at the central database.

17 Claims, 9 Drawing Sheets

—300

9:41    302

<      Team Set Up

Lineup

304

| Order | Name | # | Position | |
|-------|------|---|----------|---|
| 1 | Braukmann | 18 | SS ˅ | ≣ |
| 2 | Jackson | 13 | 2B ˅ | ≣ |
| 3 | Moore | 25 | 1B ˅ | ≣ |
| 4 | Thompson | 18 | CF ˅ | ≣ |
| 5 | Baxter | 22 | LF ˅ | ≣ |
| 6 | Cho | 10 | 3B ˅ | ≣ |
| 7 | Thompson | 34 | RF ˅ | ≣ |
| 8 | Reynolds | 08 | C ˅ | ≣ |
| 9 | Smith | 40 | P ˅ | ≣ |

306

Start Game

400

500

9:41

Undo    Box Score     508

Top 1st

0 - 0

Warriors Ballpark, Portland, OR     Jan 31, 2022 • 7:00 PM

502

Scoring    Feed    Player Change    Score Keeper

Pitching                  Up to Bat

504

Balk

Tap and hold the baserunner to open more options

506

Bat on Ball

Outs ● ○

Strikes ○ ○   Called Strike   Swinging Strike   Drop 3rd Strike

Balls ○ ○ ○   Ball   Hit By Pitch   Int. Walk

600

9:41

✕     Menu

Welcome Back

Benny Braukmann

602

Get Started

Practice Game

Settings

Profile Privacy

Personal Score Keepers

Notifications

Stats

Stats Reference

About Baseballism

Terms and conditions

Help

604

Sign Out

PLAYER PROFILE DATA MANAGEMENT SYSTEM

PRIORITY

The present application claims priority to U.S. Provisional Application No. 63/364,317, entitled "PLAYER PROFILE DATA MANAGEMENT SYSTEM", and filed on May 6, 2022. The entirety of the above-listed application is hereby incorporated by reference for all purposes.

FIELD

The present description relates generally to methods and systems for managing data and statistics for sports players.

BACKGROUND/SUMMARY

In addition to watching sporting events, sports enthusiasts may enjoy tracking a performance and statistics of leagues, teams, and individual players. In particular, utilities have been developed enabling sports enthusiasts to follow live updates of sporting events. The utilities, such as software applications or apps, may provide a platform for a sports enthusiast to input information in real-time which may be accessed, shared, and/or viewed by others. However, such utilities for tracking sporting event results may store and present retrieved information as an agglomeration of data reflecting an overall performance of a team. As such, the information may not indicate achievements specific to the individual team players. In instances where a player changes teams and/or leagues, records related to the player may not be propagated to the new team or league profile and the team and/or league profile may become outdated or inaccurate.

Furthermore, the sports event utilities may rely on real-time input during a sporting event. For example, as a user enters data into an app for uploading information to a shared sports information platform, the data may be immediately populated to the platform. Real-time data input may lead to transmission and storage of erroneous data, precluding opportunities for the user to review the input data before it is transmitted. An integrity of the information provided by the platform may be degraded as a result.

In one example, the issues described above may be at least partially addressed by a method, including, responsive to an indication of initiation of a sub-event of a sporting event at a computing device, accumulating data during the sub-event, the data input to the computing device by a user, and delaying transmission of the data to a central database based on a pre-set delay interval. In response to an indication of completion of the pre-set delay interval, the data is transmitted to the central database and correlated with hierarchically-arranged data profiles stored at the central database. In this way, the information provided by the database may more accurately reflect current and actual statuses and records of players, teams, and leagues of a sport.

For example, the pre-set delay interval may be determined based on sub-events specific to the sporting event type. As an example, when the sporting event is a baseball game, the pre-set delay interval may be set based on sub-events such as innings, players' turn to bat, player outs, etc. The pre-set delay interval may allow a user to review the data input to the computing device prior to transmission, thereby increasing a likelihood that the user notices errors in the data input and addresses the errors. Furthermore, the strategies described herein may allow automatic population of the hierarchically-arrange data profiles amongst related data profiles. As a result, tracking of data relevant to the sporting event is more meaningful and useful.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
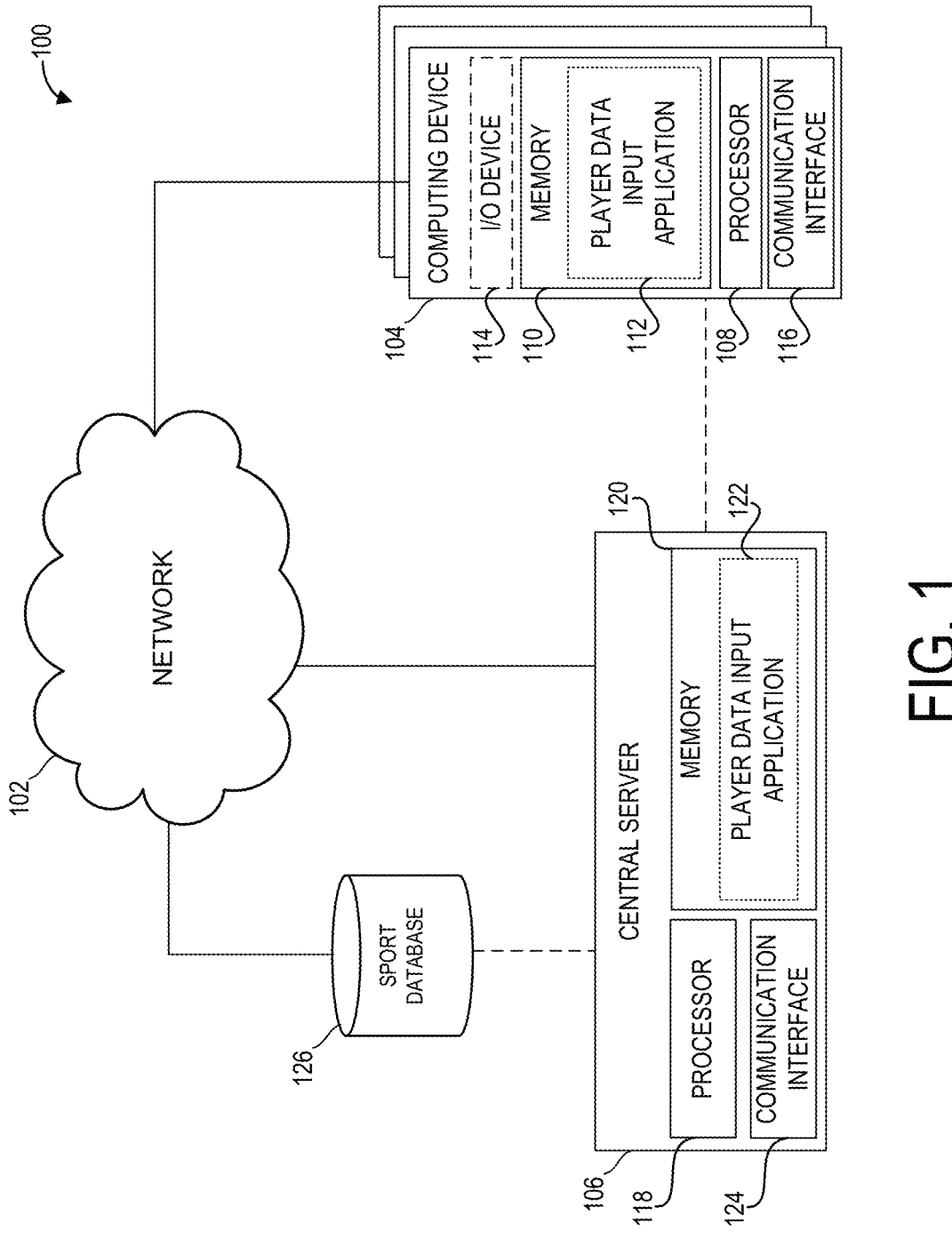
FIG. 1 shows a block diagram illustrating an example networked system for transferring data from a mobile device to a database, the mobile device including a player data input application, according to an embodiment.
Figure 2:
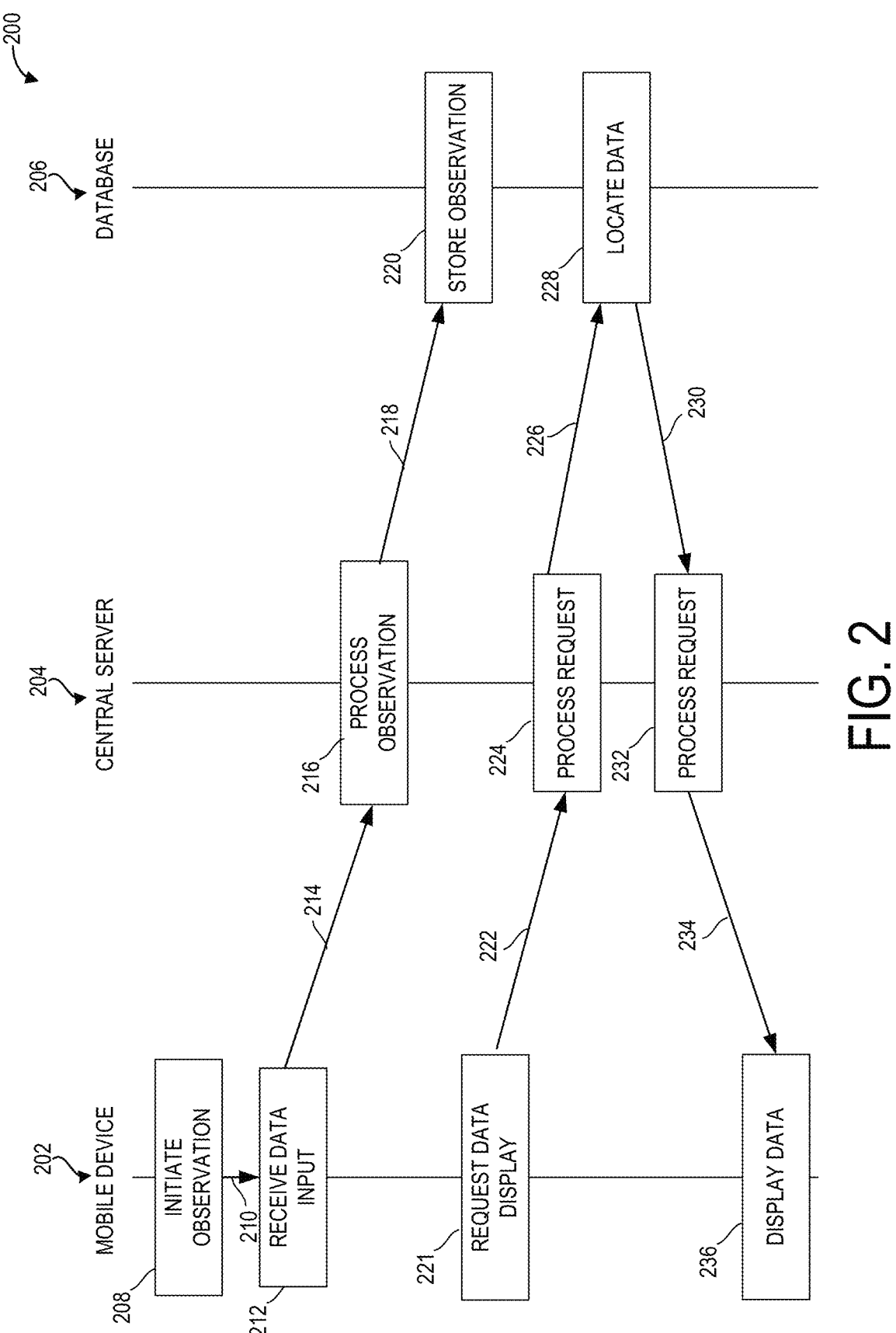
FIG. 2 shows a communication diagram for example communications between a mobile device, a database, and a central server, based on the player data input application, according to an embodiment.
Figure 7:
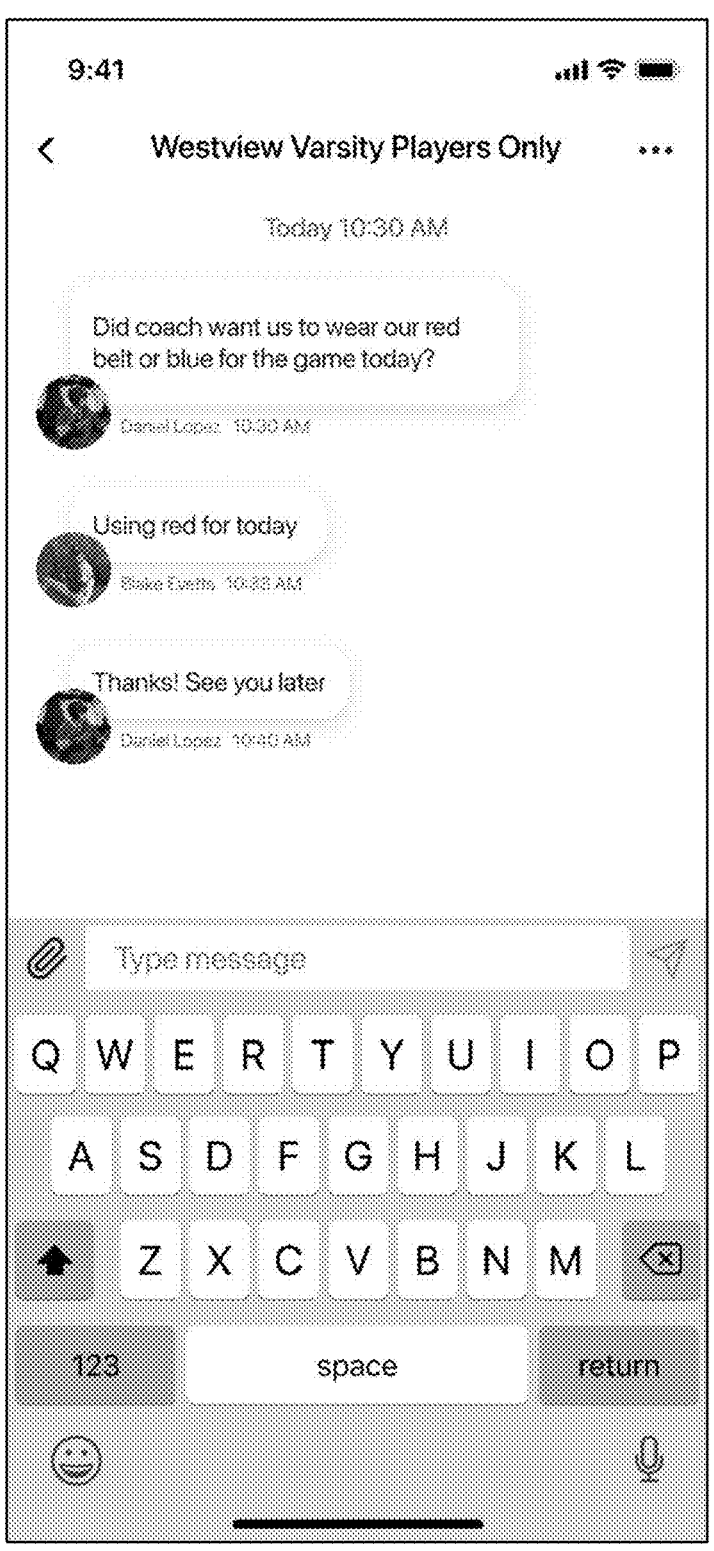
FIG. 7 shows a fifth example of a user interface of the player data input application, according to an embodiment.
Figure 8:
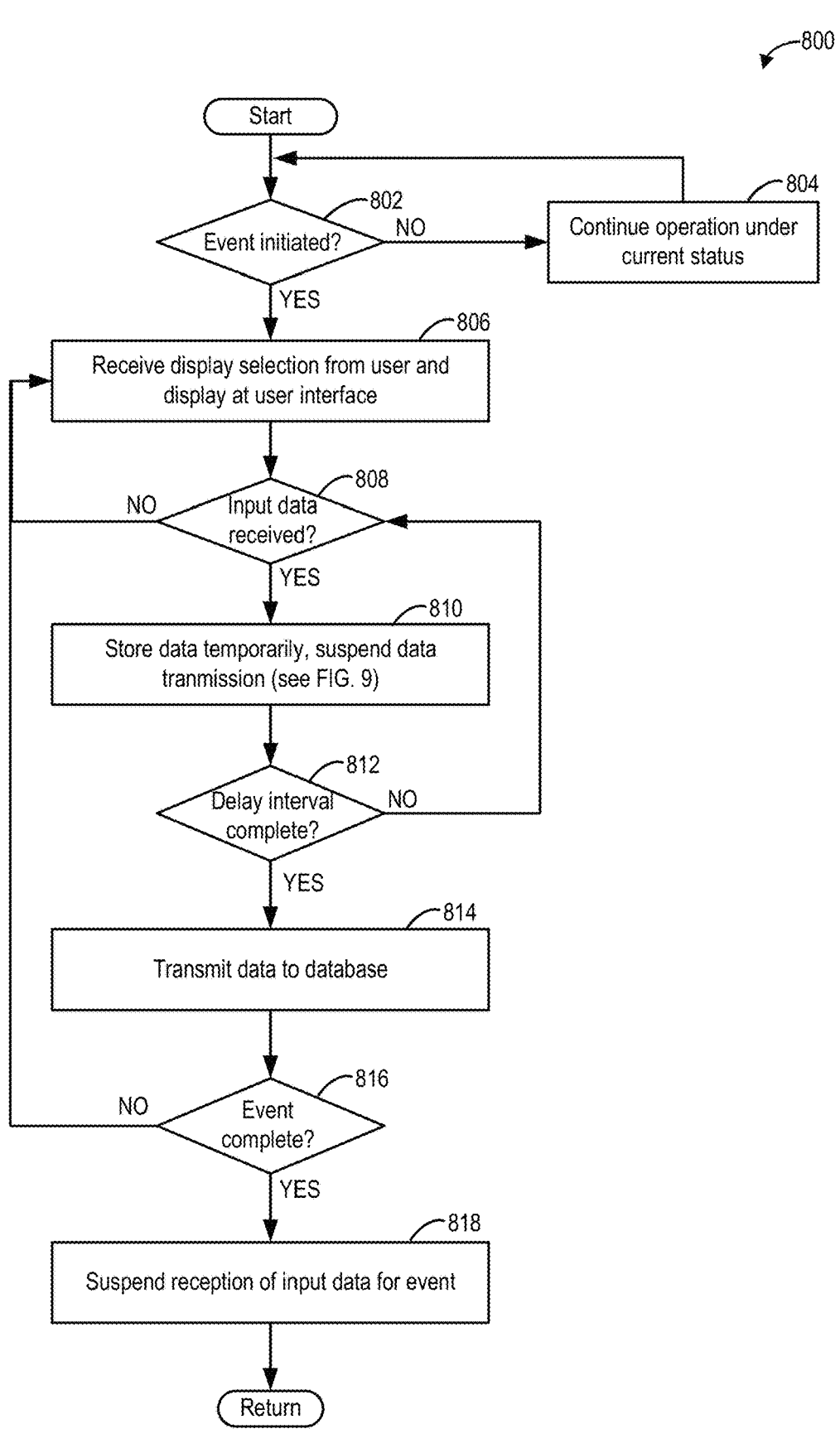
FIG. 8 shows a method for acquiring and storing data via the player data input application, according to an embodiment.
Figure 9:
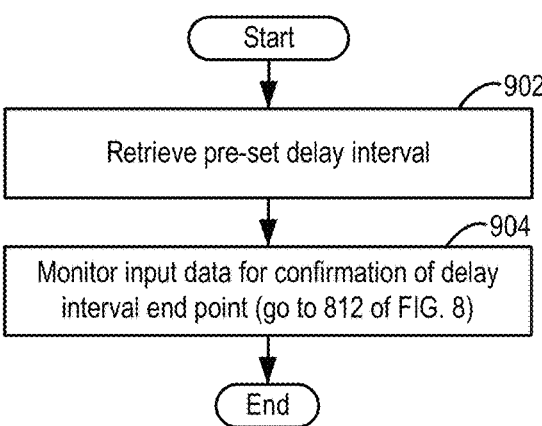
FIG. 9 shows a method for implementing a pre-set time delay of the player data input application, according to an embodiment.

The following description relates to systems and methods for data management for sporting events and sport players. A player data input application may be implemented at a computing device to allow a user to input data at the computing device, the input data related to information and statistics for a sport player, for example. The computing device may be communicatively linked to a central server and a central database by a network, as depicted in FIG. 1. Flow of communication between the computing device, central server, and central database according to the player data input application is illustrated in FIG. 2. As shown in FIGS. 3-7, data input and user-editable fields may be presented at various user interfaces of the player data input application. Methods for using the player data input application to input data during sporting events and update the central database are shown in FIGS. 8-9.

Turning now to FIG. 1, a data management system 100 is shown, including a plurality of devices configured to generate, process, store, transmit, and/or otherwise manage data related to a field of interest, such as sports. As shown in FIG. 1, one or more devices, such as a computing device 104, may be communicatively connected to a network 102, such that the computing device 104 may remotely communicate with a central server 106. In one example, the computing device 104 may be a personal computing device, such as a mobile device or phone, a tablet, etc.

The network 102 may include one or more interconnected communication networks, including for example, a cellular communication network, a local area network (LAN), a wide area network (WAN), a public network (e.g., the Internet), an enterprise private network, and/or combinations thereof. Network/communication interfaces of the central server 106 and the computing device 104 may employ one or more suitable communication protocols defining rules and data formats for exchanging information and communicating over the network 102, such as User Datagram Protocol/Internet Protocol (UDP/IP), and/or Transmission Control Protocol/Internet Protocol (TCP/IP). The central server 106 and the computing device 104 may connect to the network 102 via a hardwired link, such as an IEEE 802.3 (Ethernet) link, a wireless link using a wireless network protocol, such as an 802.11 (Wi-Fi) link, and/or any other suitable link for interfacing with the network 102. In some examples, the central server 106 may connect to the computing device 104 via a direct hardwired or wireless link.

The computing device 104 may include at least one processor 108 for executing one or more instructions stored in memory 110. That is to say, the memory 110 may store computer-readable instructions that, when executed by the processor 108, may cause components of the computing device 104 to perform one or more operations as will be described herein. An example of instructions stored in memory 110 includes a player data input application 112.

The memory 110 may represent random access memory (RAM) comprising the main storage of a computer, as well as any supplemental levels of memory, e.g., cache memories, non-volatile or backup memories (e.g., programmable or flash memories), mass storage memory, read-only memories (ROM), etc. In addition, the memory 110 may be considered to include memory storage physically located elsewhere, e.g., cache memory in any computing system in communication with the computing device 104, as well as any storage device on any computing system in communication with the computing device 104 (e.g., a remote storage database, a memory device of a remote computing device, cloud storage, etc.).

The computing device 104 further comprises an input/output device 114 and a communication interface 116. The input/output device 114 of the computing device 104 may be configured to receive data from input sources and output data to output sources, thereby serving as an interface between the input sources, the output sources, and the computing device 104. For example, the input/output device 114 may receive input data from a user input device such as a keyboard, mouse, microphone, touch screen/touch pad, and other such user input devices, and output data to one or more user output devices such as a display (e.g., a computer monitor), a touch screen, speakers, and/or other such output devices that may be used to output data in a format understandable to a user. As such, in some examples, the processor 108 of the computing device 104 may execute stored instructions using information (e.g., user input data) from the input/output device 114 and may control an output device by sending instructions to the input/output device 114 based on an execution of the stored instructions. It is to be understood that the user input device(s) and/or the user output device(s) may be integrated with the computing device and/or may include peripheral devices communicatively connected to the computing device.

The player data input application 112 may include code that, when executed by the processor 108, facilitates interfacing between a user of the computing device 104 and the central server 106. For example, the user may input data (e.g., via an input device interfacing with input/output device 114) for generation of data for a particular player of a team sport. The player data input application 112 may process the input data, generate an entry, e.g., data to be transmitted to a central database, and control the communication interface 116 to transmit the entry to the central server 106 (e.g., via network 102).

The central server 106 may include at least one processor 118 for executing one or more instructions (e.g., stored in memory 120) to perform and/or cause components of the central server 106 to perform one or more operations. The central server 106 may further include the memory 120 and a player data input application 122 stored thereon.

The player data input application 122 may comprise code that, when executed by the processor 118, instructs the central server 106 (e.g., via a communication interface 124) to receive data output from the computing device 104. For example, the memory 120 includes computer-readable instructions (e.g., including player data input application 122) that, when executed by the processor 118, may instruct the central server 106 to receive the entry generated and transmitted by the computing device 104. The entry may then be automatically transmitted by the central server 106 to a sport database 126, which may also be a central database. The central server 106 may include the communication interface 124, which may be substantially similar to communication interface 116 of the computing device 104.

The sport database 126 may represent a storage device (or linked storage devices) that is local or remote relative to the central server 106. The sport database 126 may include a plurality of databases, including a league database, a team database, a tournament database, a player database, and the like. The sport database 126 may include data associated with a player (e.g., a sport player), including but not limited to a player's name, the player's team, a league and/or tournament that the player is a member of or participating in, the player's event history, the player's position in the sport, the player's performance record, personal information for the player (e.g., age, height, weight, etc.), and/or any other such relevant information. The sport database 126 may also include computing device credentials, such as a user name and a password or personal identification number (PIN) that is assigned to the user name, for use in accessing the application server and/or verifying a computing device's identity.

The sport database 126 may also store team data and league and/or tournament data. For example, the team data may include the team name, location, how long the team has been active, event history, performance record, team members, etc. The league data may include the league name, associated teams in the league, age of the league, event history, annual rankings of the teams in the league, etc. Further, the tournament data may include the tournament name, teams and team members participating in the tournament, etc., as well as any relationship between the league data and the tournament data. The player data, team data, tournament data, and league data may therefore be correlated. For example, the league data may be associated with specific teams, the team data may be associated with specific players, and the tournament data may be associated with specific leagues and teams.

In one example, the computing device 104 may transmit an entry to the central server 106 in a manner described above. The entry is received by the central server 106, where the entry is correlated to a player profile stored in the sport database 126. The correlation may include matching player data transmitted with the entry (e.g., name, age, and the like)

to data stored in the player database of the sport database 126. The entry may be further correlated to data stored in one or more of the team database, the tournament database and the league database. The entry may therefore be assigned to a suitable location in the databases, thereby updating the data stored in the databases.

By updating the sport database 126 based on the entry submitted by the computing device 104, the data stored and accessible by other computing devices may be more accurate and complete, e.g., the data may reflect an actual, current status of the player, associated team(s), associated tournament(s) and associated league(s). The player data input application 112 may be configured with code defining rules for how the entry is delivered to the central server 106 to be uploaded to the sport database 126. For example, the rules may include pre-set time intervals and/or triggers for initiating a time delay when the entry is sent to central server 106 for uploading to the sport database 126. As one example, the player may be a baseball player and an entry providing play information based on a batting event of the player, e.g., the player is up to bat, may be input at the computing device 104 by a user. The entry may indicate a start to the batting event, or a play, thereby triggering initiation of a pre-set time delay. The rules implemented at the player data input application 112 may be set to delay transmission of the entry to the central server 106 for uploading to the sport database 126 until a following batting event is completed, e.g., the play is over. During a time of delay, additional data may be added to the entry and/or additional entries may be generated. For example, actions scored by a scorekeeper may be added to the entry or entries during the delay time. When an endpoint of the time delay is indicated, e.g., by an entry or input data confirming the batting event is over, the entry or entries may be delivered to the central server 106 and uploaded to the sport database 126. As such, the delay may be a pre-set delay interval dependent on a pre-determined criteria defining completion of the pre-set delay interval, which may be a one-play delay, as described above.

The player data input application therefore enables data to be accumulated and propagated in a hierarchical manner. A unique, individual player profile may be created and populated with input data and statistics (e.g., by a third party such as a computing device user) associated with a sporting event. The input data and statistics may also be accumulated at corresponding team profiles, where the team profiles are collections of associated player profiles assigned to a respective team profile during a sporting event. The input data and statistics may further be accumulated at corresponding league profiles, where the league profiles are collections of multiple associated team profiles. Additionally, the input data and statistics may be accumulated at corresponding tournament profiles, where the tournament profiles are also collections of multiple associated team profiles, which may be different or similar to the collection of team profiles of the league profiles. In some examples, depending on the type of sport, the profile hierarchy may include one of the league profiles or the tournaments profiles, while in other examples, both may be included. The data accumulation may occur at any profile level, e.g., at any of the player, team, or league profiles, over any time period and be automatically propagated to the higher level profiles. The accumulated data, once uploaded to the sport database 126, may be viewed at a computing device, e.g., a mobile device, a tablet, etc., at any time interval indicated by the user.

Furthermore, in some examples, delayed data transmission from the computing device to the sport database via the central server, as described above, may be implemented by the player data input application. Data may be entered by the user at the computing device, where the user may be a player or an observer, and transfer of the data to the sport database may be suspended until completion of a time interval. The time interval may correspond to a selected event, such as completion of a play, action, event, etc., and may be indicated by the user or may be included in the rules of the player data input application, which may or may not be editable by the user. The delay in data transmission may therefore be defined as a difference between an imputed observation, e.g., a play, action or event, etc., and a completion of a following observation. After the following observation is complete, the imputed observation is submitted to the sport database.

The delay in data transmission may therefore be a user-defined delay interval, and/or a pre-set delay interval. The user-defined delay interval may allow customization of uploading of data to the sport database 126 according to user preferences while the pre-set delay interval may be an automatic process for updating the sport database 126. For example, for the pre-set delay interval if multiple users are observing the same sporting event and using the player data input application the sport database 126 for the same sporting event concurrently, unifying a timing at which data uploading is delayed and delivered based on pre-determined and automatically implemented intervals may enable synchronizing of updated data that is displayed amongst the various computing devices of the multiple users. The pre-set delay interval may therefor provide an efficient method to organize large quantities of data entered concurrently or at different times.

In this way, data may be input to the sport database with greater accuracy, with respect to an actual, current status of the sport at multiple levels. The user may provide data specific to a player, a team, a tournament, or a league, and the data may be observed by other users. By enabling player information to be tracked via user input at the player data input application, player profiles may be populated with up-to-date information which may then be automatically propagated to associated team and league profiles. Loss of player-specific information may be mitigated when a player changes teams or leagues, thereby increasing the accuracy of the information stored at and retrieved from the sport database. Additionally, the accuracy of the information is further increased by delaying data transmission from the computing device to the sport database. The time delay allows the user to review the input data for errors, as well as contribute additional, associated data, thereby providing more complete information regarding an observation.

As described above, player profile data (as well and team and league profile data) may be input to and retrieved from a central database using a computing device. The data may be input and output as illustrated in FIG. 2 in a communications diagram 200. The communications diagram depicts communication between a computing device, e.g., a mobile device 202, a central server 204, and a database 206. In one example the mobile device 202, the central server 204, and the database 206 may correspond to the computing device 104, the central server 106, and the sport database 126 of FIG. 1. At 208, upon receiving an indication from a user, an observation may be initiated, e.g., an event of data accumulation. Instructions for receiving data at the mobile device 202 and for monitoring a start and end point of the observation may be retrieved by a player data input application of the mobile device, the instructions stored in a memory of the mobile device, and executed at 210. Data input by the user to the mobile device 202 may be received at 212 and, at 214, the data may be transmitted to the central server 204, upon indication that the observation is complete, as described above.

The observation is processed by the central server 204 at 216. For example, the transferred data may be converted to a suitable format for storage at the database 206. Furthermore, metadata may be assigned to the transferred data, the metadata identifying the data as pertaining to a specific player, team, or league. At 218, the processed observation is uploaded to the database 206 and, at 220, data may be stored at suitable locations within the database 206, as determined based on the assigned metadata.

As such, data input to the mobile device 202 may be entered in one format and stored as another format. For example, the transferred data may initially be input to the mobile device 202 in a first format that is specific to a configuration of the mobile device 202 for receiving input data. Upon receiving the data at the database 206 from the central server 204, the first format of the data may be identified at the database 206, e.g., by a processor controlling data traffic through the database 206, and compared to a second format, which may be a data storage format of the database 206. If the first format is not the same as the second format, the data may be converted from the first format to the second format.

Communication between the mobile device 202, the central server 204, and the database 206, during retrieval of stored data from the database 206 to be displayed at the mobile device 202, is also shown in the communications diagram 200. For example, at 221, a request to display data regarding a player, team, or league is input to the mobile device 202 by the user. The request is transmitted to the central server at 222 and received by the central server 204 where the request is processed at 224. Processing of the request may include identifying the specific player, team, or league that is the subject of the request and identifying metadata associated with the player, team, or league to allow the subject to be located in the database 206.

At 226, the request for data retrieval is sent to the database 206 and, at 228, the request is correlated with stored data to locate data relating to the subject of the request. The data is sent back to the central server 204 at 230. The central server 204 processes the data and converts the data into a suitable format at 232 for display at the mobile device 202. The converted data is transmitted to the mobile device at 234 and displayed at the mobile device 202 at 236.

For example, as described above, the data may be stored in the second format, suitable for storage at the database 206. When the data is requested, the format for displaying the data at the mobile device 202 may be determined, e.g., by the processor controlling data traffic through the database 206. As one example, the format for displaying, e.g., outputting, the data may be the first format corresponding to the configuration of the mobile device 202. In another example, the format for outputting the data may be different from the format for inputting the data. As such, the retrieved data may instead be converted to a third format that is different from either of the first or second formats. In one example, the third format may be a different modality for displaying data at a screen. In yet another example, the third format may be a customizable format that may be selected by a user.

Data may be entered and viewed at, for example, a display screen of a computing device. The player data input application, as described herein, may include instructions for how the data is displayed and received at the display screen of the computing device. Interactive interfaces configured to present information in a comprehensive and aesthetically appealing manner are thereby provided while allowing a user to easily adjust selectable parameters and enter information. The display of the data may also allow the user to readily navigate through the displayed interfaces to observe profiles, such as player profiles, team profiles, tournament profiles, and league profiles, and acquire information regarding associations and relationships between the profiles. In addition, the instructions of the player data input application may include allowing data to be input and retrieved by registered users, e.g., users with registered accounts recognized by the player data input application.

Figure 3:
FIG. 3 shows a first example of a user interface of the player data input application, according to an embodiment.

A first example of a user interface 300 shown at a display screen of a computing device, such as a mobile device, is illustrated in FIG. 3. The user interface 300 shows a team profile 302. For example, the team profile 302 may be a profile for a team playing during a sporting event that a user is observing. Alternatively, the user may be participating in the sporting event. In one example, the sporting event is a baseball game, and the team is a baseball team. The team profile 302 presents a list of active players 304 on the baseball team for the current baseball game. The list may be populated by the user by manually entering the players' names. Identifying attributes, such as the players' numbers and positions may also be entered and/or selected by the user. By enabling the user(s) to input the relevant information regarding the players, the information recorded during the baseball game may be propagated and represented in profiles directly related to the active players. Profiles of players who are members of the team but not present for the current baseball game may therefore be unaffected by the recorded information.

It will be appreciated that while descriptions of the user interfaces provided herein are directed to single instances of each interface, e.g., as displayed at one mobile device, input may be received from multiple mobile devices concurrently during the sporting event. As the data is input at each mobile device and subsequently transmitted to a central server, after a pre-set delay as described above, the accumulated data may be cross-correlated, compiled and compared at the central server for consensus amongst the data before uploading the data to a database accessible to user via a network (e.g., the network 102 of FIG. 1). The accumulated and compiled data may be displayed at the mobile devices upon request, as described above with reference to FIG. 2.

The user interface 300 also includes a Start Game button 306. Upon selecting the Start Game button 306, activation of rules for collecting data for the sporting event, e.g., for the baseball game, may be initiated. The player data input application may include other interfaces to which the user may navigate to enter and retrieve data. For example, the user may navigate to a second example of a user interface 400, as shown in FIG. 4.

Figure 4:
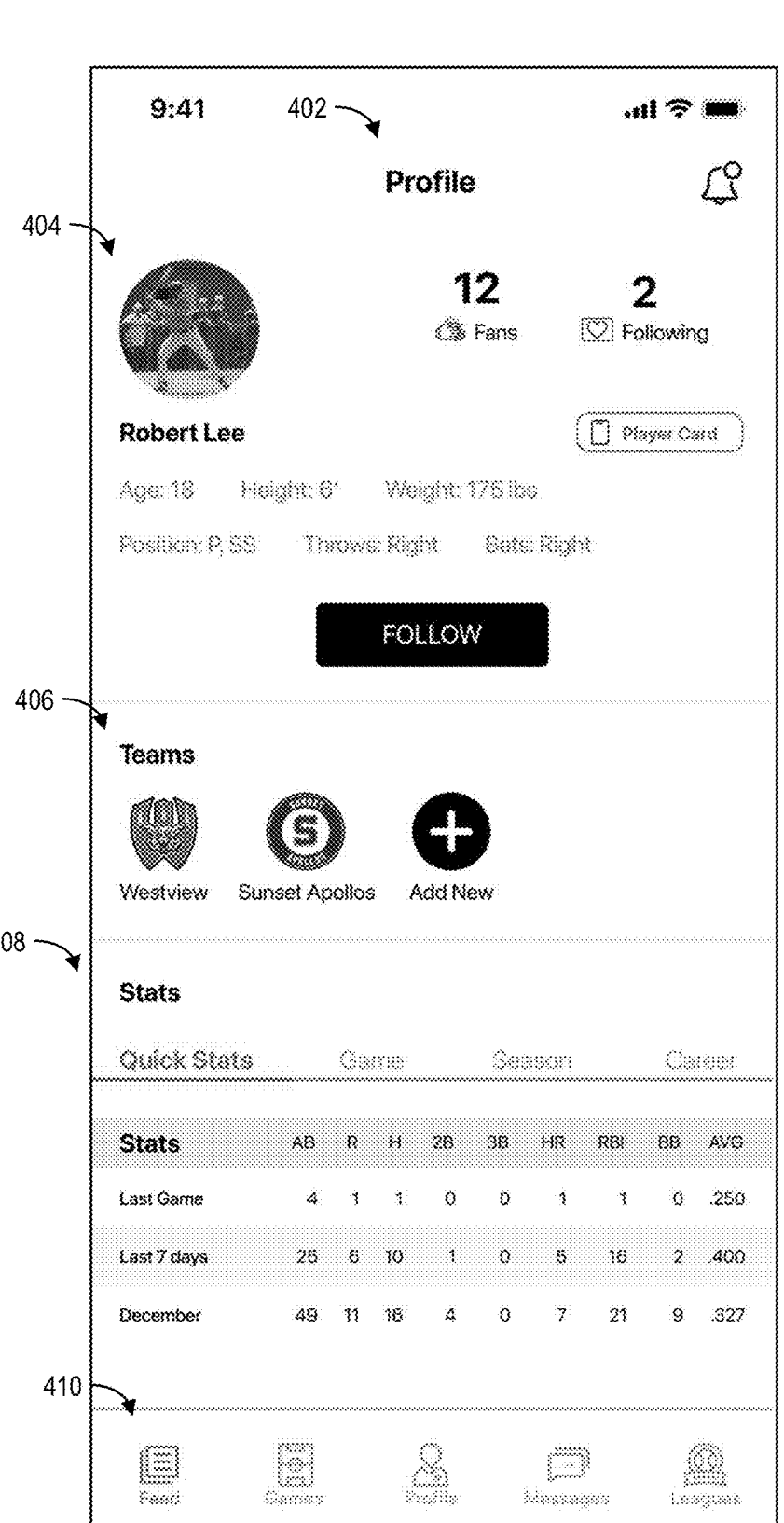
FIG. 4 shows a second example of a user interface of the player data input application, according to an embodiment.

The user interface 400 depicted in FIG. 4 may represent a player profile 402 of an active player of the baseball team. The player profile may be selected, for example, from the first example of the user interface 300 of FIG. 3, e.g., from the list of active players 304. The player profile 402 may display information specific to the player in sections of the player profile 402. For example, the player profile 402 may include a first section 404 populated with personal attributes of the player, such as age, height, weight, position, etc. A second section 406 of the player profile 402 may display teams the player is associated with, either as a current or past member thereof. The second section 406 may include an "Add New" button to allow the user to add additional teams associated with the player.

The player profile 402 may further include a third section 408 presenting statistics representing a record of the player's performance in previous events. The user may navigate to additional user interfaces relaying information related to the player profile 402 via a plurality of icons 410 displayed at the user interface 400. The plurality of icons 410 may be links to different interfaces displaying different items related to the baseball game, such as a feed displaying current updated player statistics, actions, achievements, etc., game history, a profile page for the user, messages relaying real-time communication between users, leagues that the player is associated or was associated with.

Figure 5:
FIG. 5 shows a third example of a user interface of the player data input application, according to an embodiment.

As an example, the user may select a feed icon of the plurality of icons 410. A third example of a user interface 500 may be displayed as a result. The user interface 500 may include an interactive display with selectable headers 502, such as a scoring header, a feed header, a player change header, and a scorekeeper header, for example. Various types of data may be input and observed at the user interface 500 according to header selection. For example, as shown in FIG. 5, the scoring header may be selected, resulting in display of user-engageable images, such as an image of a playing field, e.g., a baseball diamond image 504. By touching certain regions of the baseball diamond image 504, a corresponding set of selectable variables 506 may be displayed which may be selected/adjusted by the user. Furthermore, an End Game button 508 may be displayed at the user interface 500. When selected, the End Game button 508 may indicate termination of the baseball game, and data input related to the baseball game may become unavailable to the user.

Figure 6:
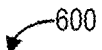
FIG. 6 shows a fourth example of a user interface of the player data input application, according to an embodiment.

A fourth example of a user interface 600 is illustrated in FIG. 6, which may be displayed when the user selects the profile icon of the plurality of icons 410 of FIG. 4. The user interface 600 depicted in FIG. 6 may represent a profile of the user, who, as described above, may be an observer or a player. The profile of the user displayed at the user interface 600 may include information regarding an account registered with the player data input application that allows the user to input data and retrieve data through the player data input application. Settings 602 shown at the user interface 600, the settings 602 related to the account of the user, may vary depending on the user. For example, as shown in FIG. 6, the user may be a player on the baseball team. The user may use the player data input application to track the user's performance and activities during the current baseball game. The user may be prompted to sign into the user's account upon activating the player data input application on the mobile device and the user interface 600 may include a Sign Out button 604 to allow the user to log out of the user's account and close the application (e.g., exit the application to end activity of the application).

The player data input application may also include provide a platform for real-time communication between users. For example, a fifth example of a user interface 700 is shown in FIG. 7, which may correspond to selection of the messages icon of the plurality of icons 410 of FIG. 4. The user interface 700 may allow users to input messages and view responses from other users, thereby allowing the users to engage with one another in real-time. In one example, user may input and view messages according to designated chat groups. For example, chat groups may be assigned to teams, to groups of fans, to coaches, etc., such that access to the chat groups is regulated.

Turning now to FIG. 8, an example of a method 800 for entering data into a player data input application, such as the player data input application 112 of FIG. 1, is shown. The method 800, as well as the method 900 described further below, may be implemented at a data management system such as the data management system 100 of FIG. 1. Instructions for carrying out the methods 800 and 900 may be executed by a processors of a central server and a computing device, such as the processors 118 and 108 of FIG. 1, based on instructions stored on memory at each of the central server and the computing device.

The method 800 may, in one example, be initiated upon user activation of the player data input application (hereafter, the application, for brevity). For example, the user may open the application on a mobile device and sign into the user's account, thereby commanding the mobile device to refer to instructions and rules for operating the application. At 802, the method 800 includes confirming if an event is initiated. For example, as shown in FIG. 3, a Start Game button (e.g., the Start Game button 306), may be selected by the user, indicating that a sporting event is occurring and data is to be input to the application.

If initiation of the event is not confirmed, the method 800 proceeds to 804 to continue operation of the application under the current operating status and conditions. For example, the user may be able to select certain options and input data that does not correspond to a sporting event. Parameters such as user account settings may be modified and chat groups may be accessed by the user but updating of player, team, and league profiles may be unavailable.

If initiation of the event is confirmed, the method 800 continues to 806 to receive a display selection from the user and display the selection at a user interface of the mobile device. For example, the user may wish to navigate to a display of a player profile by selecting a player from a list of players presented at the user interface. The application may then adjust the display to show the selected player profile. Alternatively, if no display selection is detected, the application may remain at a current display at the user interface.

At 808, the method 800 includes confirming if input data is received from the user. As an example, the user may input data by entering information at an input-receiving field of the user interface or by selecting an option at a user-modifiable parameter displayed at the user interface. If the input data is not received, the method 800 returns to 806 to receive a display selection from the user and display the selection, as described. Alternatively, the display may be maintained at a current status if no change in display is indicated by the user.

If the input data is received, the method 800 continues to 810 to temporarily store data and suspend transmission of the data to a database via a central server. For example, the input data may be stored at a local memory of the mobile device. Transmission of the data may be suspended or delayed until a pre-set delay interval is complete, as elaborated at FIG. 9 and described further below.

At 812, the method 800 includes confirming if the delay interval is complete. Completion of the delay interval may be determined according to the method 900, as described below. If the delay interval is not complete, the method 800 returns to 808 to confirm if input data is received. If the delay interval is complete, the method 800 continues to 814 to transmit the input data to the central server which converts the input data to a suitable format for storage, assigns identifiers, such as metadata, to the input data, and delivers the converted input data to the database for storage.

At the database, the input data may be populated to a corresponding player profile, based on, for example, the metadata assigned to the input data. Population of the player profile with the input data may be executed irrespective of one or more team profiles associated with the player profile. In other words, the input data is added to the player profile to update the player profile without concurrent population of the one or more team profiles linked to the player profile. Thus, a storage location of the input data is at the player profile only. Upon request for retrieval of one of the team profiles associated with the player profile, or a league profile associated with the player profile, new data populated at the player profile may be queried and populated at the corresponding team or league profile to be retrieved.

At 816, the method 800 includes confirming if the event is complete. In one example, completion of the event may be indicated by the user selecting an End Game button, such as the End Game button 508 of FIG. 5. It will be appreciated that the use of the Start Game button and the End Game button to indicate the start and end of the event is a non-limiting example and other methods for indicating the start and end of an event have been contemplated.

If the event is not indicated to be complete, the method 800 returns to 806 to receive and display a display selection based on user request, as described above. If the event is confirmed to be complete, the method 800 proceeds to 818 to suspend reception of data input pertaining to the event by the application. The method 800 returns to the start.

It will be noted that if, at any point during execution of the method 800, the user logs out of the associated user account, activity of the application, with respect to the user account may be suspended.

Turning now to FIG. 9, the method 900 is shown for implementing a delay interval before transmitting the input data from the mobile device to the database. The delay interval may be used at 810 of FIG. 8 to suspend transmission of input data received at the mobile device to the database via the central server. At 902, the method 900 includes retrieving stored instructions for executing the delay interval. For example, the delay interval may be a pre-set interval, e.g., code and algorithms written into the application, that automatically commands delaying data transmission to the database upon initiation of an event (e.g., the baseball game). In some examples, the delay interval may be pre-set based on the application code. As another example, the delay interval may be pre-set in the application as more than one pre-set option which may be used in combination or alternatively.

In some examples, the delay interval may be administrator-drive, e.g., set during development of the application by an administrator. In other examples, however, the delay interval may additionally or alternatively be user-driven, although user-driven delay may complicate updating of a database. For example, the application may include pre-set delay intervals coded into the application, which may be set according to a type of event (e.g., type of sport) and sub-events of the specific sport, as described below. In one example, the pre-set delay intervals may be automatically implemented by the application without an ability of the user to modify or choose the pre-set delay intervals. In other examples, the pre-set delay intervals may be offered to the user as a list of selectable pre-set delay intervals at a settings menu of the application, as an example. The settings menu may further include customizable pre-set delay intervals, which the user may determine and enter into the setting menu. For example, the user may indicate pre-set delay intervals based on the sub-events or select a specific time duration, such as 15 minutes.

As an example, the delay interval may be based on the type of event occurring. As an example, for the baseball game, the delay interval may be pre-set to suspend data transmission according to a pre-defined sub-event, such as a play. For example, the play may be a player's turn to bat, such as a first player's turn to bat. Any data input to the mobile device during the first player's turn to bat is stored temporarily in the mobile device memory until the first player's turn to bat is over and a second player is up to bat, where the second player's turn to bat occurs subsequent to and immediately after the first player's turn to bat. The delay interval may continue until the second player's turn to bat is complete and upon completion of the second player's turn to bat, the temporarily stored input data accumulated during the first player's turn to bat may be transmitted.

During the second player's turn to bat, input data may be similarly accumulated and stored locally at the mobile device. However, the input data received during the second player's turn to bat may be stored separately, e.g., as a discrete package of data, from the input data accumulated during the first player's turn to bat. The input data from the second player's turn to bat is therefore not transmitted when the second player's turn to bat ends. Instead, the input data collected during the second player's turn to bat is transmitted after a third player's turn to bat, occurring after the second player's turn to bat, is over. The delay interval may therefore be a one-play delay interval.

In instances where the current player up to bat is a final turn to bat for a batting line-up, the input data accumulated during the final player's turn to bat may be transmitted after a subsequent notable action is complete, such as completion of a changeover of team positions (e.g., batting team and field team switch with one another).

The delay interval may be pre-set based on other sub-events specific to the event type. For example, for the baseball game, the delay interval may alternatively be pre-set according to team position changeover, innings, player outs, etc. As another example, when the event is a hockey game, the delay interval may be pre-set based on period, when players are switched on and off the ice, on scored goals, etc. The completion of the sub-event upon which the delay interval is pre-set may be determined based on confirmation from the user, e.g., the user inputs information to the mobile device that the sub-event is over. Additionally or alternatively, the application may monitor remote data input from other users of the application via a network, such as the network 102 of FIG. 1, for information indicating that the sub-event is over.

At 904, the method 900 includes monitoring the input data, as described above, for detection of an end point of the delay interval, and returning to 812 of FIG. 8 to confirm completion of the delay interval. The method 900 ends. The input data that is uploaded to the database after the delay interval may be used to update the information stored at the database and allow subsequent data retrieval from the database to display the updated information at computing devices communicatively linked to the database via the network. Furthermore, the uploaded data is automatically correlated to other related data by the central server such that the other profiles that demonstrate an association with the input data is also updated with the input data.

For example, the input data may include a batting performance of a player during the player's turn to bat. The input data may be assigned metadata by the application at the mobile device and stored locally at the mobile device during the delay interval. When transmitted to the database via the central server, the central server may, upon processing the input data and converting the input data to a suitable format for storage, analyze the metadata and scan the stored data at the database for matching metadata. Upon locating one or more matches, the input data may be transmitted to the database to be stored at locations associated with the matches. The matched locations may include data stored for the player's profile, data stored for team profiles corresponding to teams that the player was or is a member of, and data stored for league profiles corresponding to leagues that the player was or is a member of.

In one example, saving and displaying of individual statistic calculations, e.g., of each player participating in the sporting event, may be delayed according to a pre-set period. For example, although play data may be input according to the pre-set delay interval, such as the one-play delay, updated player statistics incorporating the input data may not be displayed to users until a longer time interval, relative to the pre-set delay interval, has passed. This may allow all data input to be received, analyzed, and processed synchronously for more accurate calculation of the player statistics. As an example, the player statistics may not be saved at the database and displayed to users, e.g., at individual computing devices, until completion of half of an inning, when the sporting event is the baseball game. The half of the inning may correspond to three consecutive outs.

By matching and storing the input data with correlated data at the database, the corresponding profiles, when requested by a user, may be displayed with the input data, thereby presenting the user with updated information. Current statuses of associated players, teams, and leagues may be provided to the user in a more accurate and relevant manner. Input data may be automatically organized and stored such that the input data is used to populate hierarchically related profiles. Furthermore, by delaying the transmission of the input data to the database according to the pre-set delay interval and delaying updating of player statistics according to the pre-set period, the user may be able to review the input data and correct errors prior to transmission.

The technical effect of managing sports data as described herein is that player profiles may be automatically and efficiently updated to reflect actual statuses and histories of the players with reduced error. A further technical effect includes automatic propagation of the sports data to related, hierarchically higher level profiles, such as team profiles and league profiles, thereby reducing user effort and computing burden to maintain updated records.

The disclosure also provides support for a method comprising: responsive to receiving, at a display of a computing device, a request for initiating a sub-event of a sporting event, accumulating data during the sub-event, the data input to the computing device by a user, delaying transmission of the data to a central database based on a pre-set delay interval, and responsive to receiving, at the computing device, a confirmation of completion of the pre-set delay interval, transmitting the data to the central database and correlating the data with hierarchically-arranged data profiles stored at the central database. In a first example of the method, the method further comprises: storing the data at the central database with one or more of the hierarchically-arranged data profiles, and wherein the hierarchically-arranged data profiles includes player profiles, team profiles, and league profiles. In a second example of the method, optionally including the first example, delaying the transmission of the data based on the pre-set delay interval includes delaying the transmission of the data based on a duration of the sub-event. In a third example of the method, optionally including one or both of the first and second examples, delaying the transmission of the data based on the pre-set delay interval includes delaying the transmission according to an administrator-driven delay interval. In a fourth example of the method, optionally including one or more or each of the first through third examples, delaying the transmission of the data includes delaying the transmission based on a one-play delay, and wherein when the sporting event is a baseball game, the one-play delay is a delay of a batting event of a first player and the data is transmitted after a batting event of a second player, subsequent to the first player, is complete. In a fifth example of the method, optionally including one or more or each of the first through fourth examples, the method further comprises: delaying each of saving of player statistics to the central database and displaying of the player statistics at the computing device according to a pre-set period, and wherein when the sporting event is a baseball game, the pre-set period is half of an inning. In a sixth example of the method, optionally including one or more or each of the first through fifth examples, delaying the transmission includes delaying the transmission according to one or more of sub-events specific to the sporting event. In a seventh example of the method, optionally including one or more or each of the first through sixth examples, correlating the data with the hierarchically-arranged data profiles includes identifying relevant data profiles based on metadata assigned to the data. In a eighth example of the method, optionally including one or more or each of the first through seventh examples, transmitting the data to the central database further includes populating a player profile correlated to the data with the data, and wherein the player profile is populated irrespective of one or more of team profiles, tournament profiles, and league profiles associated with the player profile. In a ninth example of the method, optionally including one or more or each of the first through eighth examples, populating the player profile with the data includes storing the data at the player profile and updating the player profile with the data. In a tenth example of the method, optionally including one or more or each of the first through ninth examples, the method further comprises: populating a corresponding profile of the one or more of the team profiles, the tournament profiles, and the league profiles associated with the player profile with the data stored at the player profile when the corresponding profile is retrieved from the central database.

The disclosure also provides support for a sports data management system comprising: a central database communicatively coupled to a central server and a network, and a computing device communicatively coupled to the central server and the network, the computing device having a processor configured with instructions stored on non-transitory memory that, when executed, cause the processor to: receive input data from a user via a player data input application user interface at the computing device, store the input data temporarily during a pre-set delay interval, and transmit the input data to the central database upon completion of the pre-set delay interval. In a first example of the system, the central database is configured to store data hierarchically assigned to one or more of player profiles, team profiles, tournament profiles, and league profiles, and wherein each of the team profiles is a collection of associated player profiles, each of the tournament profiles is a collection of associated team profiles, and each of the league profiles is also a collection of associated team profiles. In a second example of the system, optionally including the first example, a player data input application is installed at the computing device and the player data input application provides the instructions executable by the processor. In a third example of the system, optionally including one or both of the first and second examples, the player data input application includes instructions for displaying user interfaces at the computing device, and wherein the displayed user interfaces include user interfaces for entering play information, event information, event outcomes, sub-event outcomes, and direct communication between users. In a fourth example of the system, optionally including one or more or each of the first through third examples, the displayed user interfaces include user interfaces presenting a start button to indicate a start of an event and an end button to indicate an end of the event, and wherein the event is a sports game. In a fifth example of the system, optionally including one or more or each of the first through fourth examples, the computing device is one of a mobile device or a tablet.

The disclosure also provides support for a method for storing player data during a sporting event, comprising: receiving data for a player at a mobile device, the mobile device communicatively coupled to a central database, transmitting the player data to the central database to populate a player profile of the player irrespective of a team profile associated with the player profile, and correlating the player data to one or more of the team profile and a league profile, and populating the one or more of the team profile and the league profile with the player data. In a first example of the method, transmitting the player data to the central database includes transmitting the player data after completion of a pre-set delay interval. In a second example of the method, optionally including the first example, the method further comprises: displaying the player profile at the mobile device populated with the data when retrieval of the player profile is requested after the data is received is transmitted to the central database.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:

responsive to receiving, at a display of a computing device, a request for initiating a sub-event of a sporting event, accumulating data during the sub-event and storing the data locally, the data input to the computing device by a user;

automatically delaying transmission of the data to a central database based on a pre-set delay interval and suspending data transmission until the pre-set delay interval is complete; and then responsive to receiving, at the computing device, a confirmation of completion of the pre-set delay interval, transmitting the data to the central database and analyzing the data to update corresponding statistics, wherein updating the corresponding statistics includes correlating the data with hierarchically-arranged data profiles stored at the central database, wherein a central server converts the data for storage at the central database and assigns metadata identifiers to the data, and wherein correlating the data with the hierarchically-arranged data profiles includes identifying relevant data profiles based on the metadata identifiers assigned to the data.

2. The method of claim 1, further comprising storing the data at the central database with one or more of the hierarchically-arranged data profiles, and wherein the hierarchically-arranged data profiles includes player profiles, team profiles, and league profiles.

3. The method of claim 1, wherein delaying the transmission of the data based on the pre-set delay interval includes delaying the transmission of the data based on a duration of the sub-event.

4. The method of claim 1, wherein delaying the transmission of the data based on the pre-set delay interval includes delaying the transmission according to an administrator-driven delay interval.

5. The method of claim 1, wherein delaying the transmission of the data includes delaying the transmission based on a one-play delay, and wherein when the sporting event is a baseball game, the one-play delay is a delay of a batting event of a first player and the data is transmitted after a batting event of a second player, subsequent to the first player, is complete.

6. The method of claim 1, further comprising delaying each of saving of player statistics to the central database and displaying of the player statistics at the computing device according to a pre-set period, and wherein when the sporting event is a baseball game, the pre-set period is half of an inning.

7. The method of claim 1, wherein delaying the transmission includes delaying the transmission according to one or more of sub-events specific to the sporting event.

8. The method of claim 1, wherein the pre-set delay interval is a difference between an imputed observation and a completion of a following observation, wherein the mobile device communicates only with the central server, and the database communicates only with the central server.

9. The method of claim 1, wherein transmitting the data to the central database further includes populating a player profile correlated to the data with the data, and wherein the player profile is populated irrespective of one or more of team profiles, tournament profiles, and league profiles associated with the player profile.

10. The method of claim 9, wherein populating the player profile with the data includes storing the data at the player profile and updating the player profile with the data.

11. The method of claim 10, further comprising populating a corresponding profile of the one or more of the team profiles, the tournament profiles, and the league profiles associated with the player profile with the data stored at the player profile when the corresponding profile is retrieved from the central database.

12. A sports data management system comprising:

a central server;

a central database communicatively coupled to the central server and a network; and a computing device communicatively coupled to the central server and the network, the computing device having a processor configured with instructions stored on non-transitory memory that, when executed, cause the processor to:

receive input data from a user via a player data input application user interface at the computing device;

store the input data locally and temporarily during a pre-set delay interval;

automatically delay transmission of the input data to the central database based on the pre-set delay interval and suspend data transmission until the pre-set delay interval is complete; and then transmit the input data to the central database upon completion of the pre-set delay interval and analyze the input data to update corresponding statistics.

13. The sports data management system of claim 12, wherein the central database is configured to store data hierarchically assigned to one or more of player profiles, team profiles, tournament profiles, and league profiles, wherein each of the team profiles is a collection of associated player profiles, each of the tournament profiles is a collection of associated team profiles, and each of the league profiles is also a collection of associated team profiles, and wherein the computing device is a mobile device.

14. The sports data management system of claim 12, wherein a player data input application is installed at the computing device and the player data input application provides the instructions executable by the processor.

15. The sports data management system of claim 14, wherein the player data input application includes instructions for displaying user interfaces at the computing device, and wherein the displayed user interfaces include user interfaces for entering play information, event information, event outcomes, sub-event outcomes, and communication between users.

16. The sports data management system of claim 15, wherein the displayed user interfaces include user interfaces presenting a start button to indicate a start of an event and an end button to indicate an end of the event, and wherein the event is a sports game.

17. The method of claim 1, wherein correlating the data with hierarchically-arranged data profiles stored at the central database includes updating a first profile and then automatically propagating the data to hierarchically higher level profiles that are related to the first profile.

* * * * *